Figure 1:
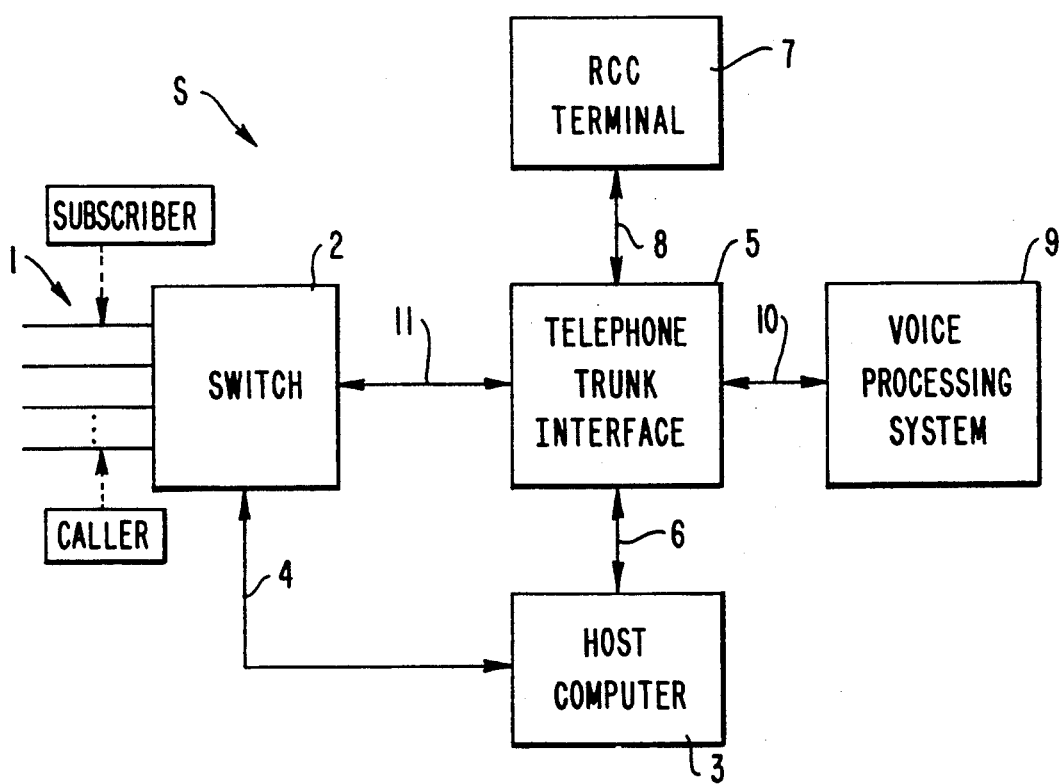

United States Patent [19]
Wolf

[11] Patent Number: 5,151,929
[45] Date of Patent: Sep. 29, 1992

[54] COMPUTER-CONTROLLED RADIO-PAGING AND TELEPHONE COMMUNICATION USING RECORDED VOICE MESSAGES

[75] Inventor: Sherman Wolf, 369 Boston Post Rd., Amherst, N.H.

[73] Assignee: Sherman Wolf, Amherst, N.H.

[21] Appl. No.: 457,663

[22] Filed: Dec. 27, 1989

Related U.S. Application Data

[63] Continuation of Ser. No. 133,214, Dec. 7, 1987, abandoned, which is a continuation of Ser. No. 776,913, Sep. 17, 1985, abandoned.

[51] Int. Cl.⁵ .......................................... H04M 11/00
[52] U.S. Cl. ....................................... 379/57; 379/67; 379/201
[58] Field of Search ....................... 379/57, 88, 89, 67, 379/201

[56] References Cited

U.S. PATENT DOCUMENTS

| | | | |
|---|---|---|---|
| 3,627,955 | 12/1971 | Stone, Jr. | 370/62 |
| 4,263,480 | 4/1981 | Levine | 379/57 |
| 4,313,035 | 1/1982 | Jordan et al. | 379/207 |
| 4,575,592 | 3/1986 | Makino | 455/38 |
| 4,680,785 | 7/1987 | Akiyama et al. | 379/57 |

FOREIGN PATENT DOCUMENTS

| | | | |
|---|---|---|---|
| 0041195 | 9/1981 | European Pat. Off. | 379/57 |
| 0046623 | 3/1982 | European Pat. Off. | 379/57 |
| 0134540 | 8/1983 | Japan | 379/57 |

OTHER PUBLICATIONS

Murata et al, "New Centrex System Provided with the Pocket Bell Radio Paging System", *Japan Telecommunications Review*, vol. 22, No. 4, 10/80, pp. 311-314.
"Voice Mail" *Sound & Communications*, vol. 28, No. 12, Apr. 1983, pp. 84-85, 379-389.

*Primary Examiner*—James L. Dwyer
*Assistant Examiner*—Dwayne D. Bost
*Attorney, Agent, or Firm*—Rines and Rines Shapiro and Shapiro

[57] ABSTRACT

A method of and apparatus for notifying a remote subscriber of a caller's attempted communication by a communication system accepting and recognizing a call for a subscriber, paging the subscriber, and connecting the original caller to the subscriber's telephone line when the subscriber calls the system in answer to the page. Other features include recording a caller message for the subscriber if the subscriber calls back to the system after the original caller has disconnected.

7 Claims, 2 Drawing Sheets

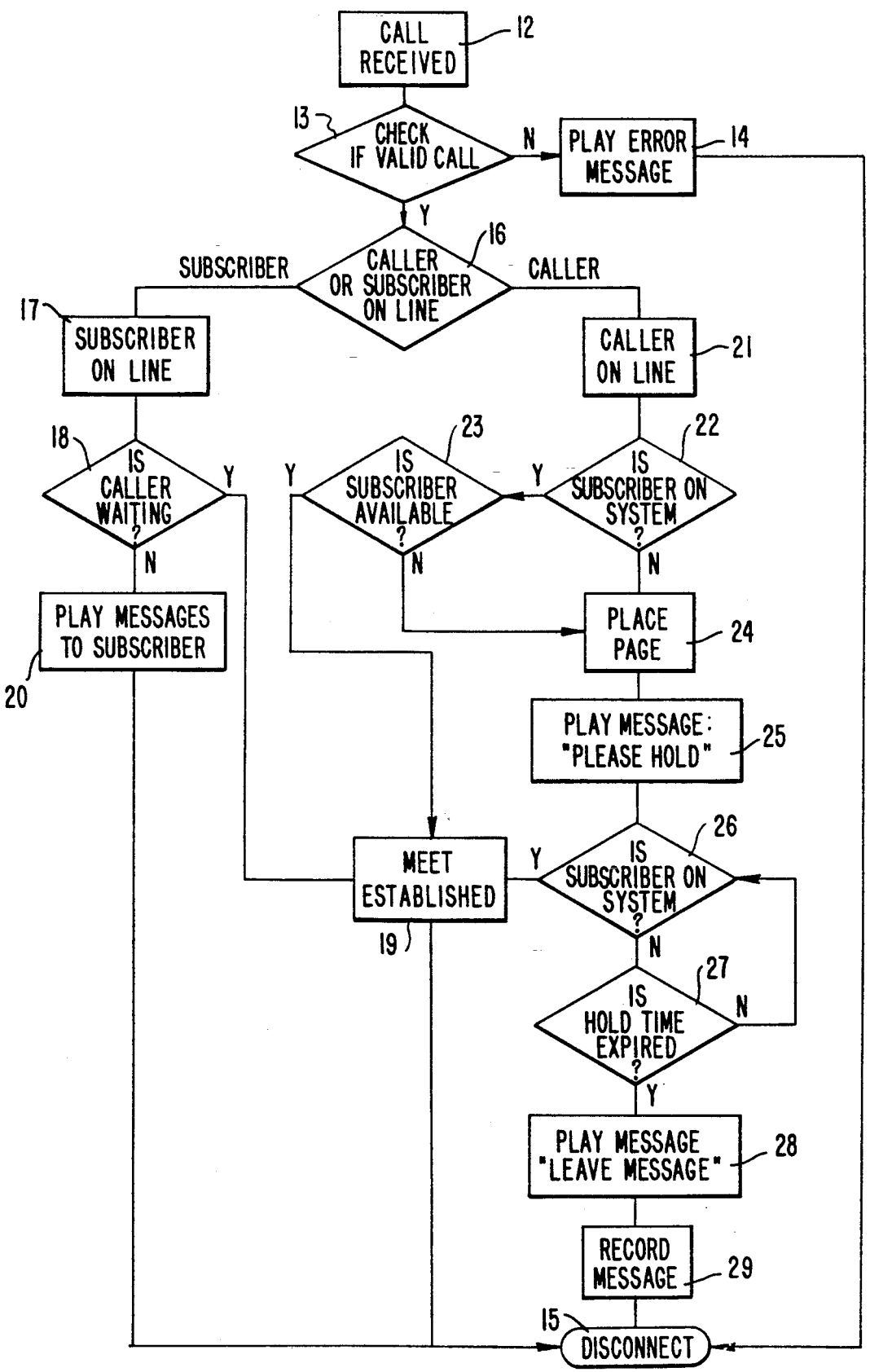

COMPUTER-CONTROLLED RADIO-PAGING AND TELEPHONE COMMUNICATION USING RECORDED VOICE MESSAGES

This is a continuation of application Ser. No. 133,214 filed Dec. 7, 1987 which is a continuation of application Ser. No. 776,913 filed Sep. 17, 1985, both now abandoned.

The present invention relates to a method of and apparatus for connecting a remote caller with a remote subscriber through a common telephone trunk interface or the like when the caller cannot reach the subscriber by more common direct calling means. More specifically, the invention is directed to a method of and apparatus for inter-connecting a telephone or other line switch, a paging terminal, a host computer and a voice recording apparatus.

Included in the present state of the art in remote call notification is the paging system. If a remote caller can not reach a paging system subscriber by normal telephonic means, such as calling all telephone numbers known to be used by the subscriber, the caller can call the paging services of the subscriber. At the paging service, an operator requests the name of the subscriber and places a page over a radio common carrier (RCC). The operator will also take a message, generally to include the name and current telephone number of the caller. The subscriber, who must carry a radio receiver, generally called a "beeper", upon hearing the beep or page from the service, calls the service by normal telephonic means to receive the message left by the caller from the operator.

More sophisticated systems allow the RCC to signal the beeper and transfer the caller's current telephone number to a display on the beeper. Such telephone number transference allows the subscriber a shorter response time to contact the original caller as the intermediary call to the service operator is obviated; but this generally severely limits the capacity of the RCC's radio channel.

Other means of remote notification include less timely message systems. In such a message system, a caller calls the subscribers's message service if unable to reach the subscriber. The caller leaves a message including return call telephone numbers and must wait until the subscriber calls in to the message service to receive notification of a previous call. Such message systems can be monitored by an operator and may use analog or digital storage means.

Another modification of the message system allows a caller to leave a message with an operator or programmed digital storage system. The operator or system, having a list of numbers by which the subscriber may be contacted, will then attempt to contact the subscriber to deliver the original caller's message. After the message is delivered, either by the operator contacting the subscriber, the subscriber calling in for messages, or by transmitting to the subscriber's paging beeper the caller's number, as mentioned previously, the subscriber must then make a separate attempt to return the call to the caller. During such wait for a subscriber's return call, the caller normally can not even determine if or when the subscriber has been notified of the original attempted communication.

It is therefore an object of the present invention to provide a new and improved method of and apparatus for notifying a remote subscriber of a caller's attempted communication and allowing the subscriber to connect directly to the caller's original call.

Another object is to provide a method and apparatus for providing useful messages to the caller, such as verifying to the caller that notification has been given to the subscriber that the caller is attempting communication.

A further object is to provide a message storage facility in the event the subscriber does not rapidly answer the page, so that later return communication can be initiated by the subscriber.

Other and further objects will be explained hereinafter and are more particularly delineated in the appended claims.

In summary, however, from one of its broader aspects, the invention contemplates a method of notifying and connecting a remote subscriber of and to a caller's attempted communication in a telephone communication system having a telephone trunk interface connected with a host computer programmed to operate the interface with a switching system, a radio common carrier terminal and a voice processing system, said method comprising, accepting through the switching system a caller's call and verifying the same for relay to a valid remote subscriber; thereupon paging the subscriber by way of the radio common carrier terminal; and, upon the subscriber answering the page within a preselected time, directly connecting the subscriber to the caller through the said interface under control of said host computer. Preferred details and best mode structures are hereinafter more particularly described.

The invention will now be described with reference to the accompanying drawings in which:

FIG. 1 is a schematic representation of a message system used in the present invention; and FIG. 2 is a flow chart diagram describing the general call protocol of the message system.

In the embodiment of FIG. 1, a message system S is shown for use in accordance with the present invention. Each subscriber is assigned a unique "call-in" number and a unique "call-back" number. A caller wishing to reach the subscriber calls the call-in number. A telephone company trunk line 1 (Telco Trunk) carries the in-coming call to a switch 2 such as the Modular Switching Peripheral (MSP) manufactured by Redcom Corporation, Rochester, N.Y.

The switch 2 passes the number being called D10 to a host computer 3 using, for example, an RS232-C line 4. A suitable digital signal processing host computer 3 is the Digital Equipment Corporation Micro 11. The host computer 3 instructs a telephone trunk interface unit 5, such as a VTK 51 of the assignee of the present invention, VoiceTek Corporation, along a RS232-C line 6, to contact the radio common carrier terminal (RCC) 7, such as the "Zip Call" type marketed by that company of Brighton, Mass.

The interface 5 is connected to the RCC 7 by a paging terminal line 8, which may be a dedicated line, a telephone line or any other suitable connection line. The host computer 3 passes on to the RCC 7, through the interface 5, the identification number of the subscriber and the RCC 7 puts out a radio page to be accepted by the subscriber's beeper.

When the subscriber calls back through the trunk lines 1, using the call-back number, the switch 2 passes the number to the host computer 3 which matches it with the waiting call-in number and instructs the switch 2 to connect the Telco Trunk 1 carrying the caller's call-in with the Telco Trunk 1 carrying the subscriber's call-back.

The system S is also enhanced by the addition of a voice storage and processing system (VPS) 9, such as VoiceTek Corporation VS30. The VPS 9 provides spoken prompts to the caller, such as to wait for the subscriber to call back or to leave a message, along voice path audio lines 10 and 11, and through the interface 5, and allows the caller to leave a spoken message for later recall by the subscriber if the subscriber can not reach a telephone to call back within a preselected time after receiving the page. The subscriber can also access such messages by calling the system S using the call-back number when no one is trying to reach the subscriber.

When used with the Voicetek VS30 the voice processing system (VPS) 9 is instructed to provide a message to the caller stating, "The subscriber is being paged, please wait until he can reach a phone." If the subscriber does not call back within a predetermined period (for instance, one minute), the VPS 9 is instructed to issue a second prompt, "Subscriber cannot reach a phone just not, please leave a message." Such messages may be prerecorded in the voice of the subscriber. The VPS 9 then records the caller's message, which can be retrieved by the subscriber when he can reach a telephone for call-back, as noted above.

The system S also provides a unique feature beyond the standard hardware described above and the programming required for the host computer 3. RCC terminals 7 provide a verifying signal to the caller indicating that the page has been placed. It is imperative for the system S to recognize this verifying signal before continuing service. Or, in the absence of the verifying signal, a message is provided to the caller, "I'm sorry; we cannot page subscriber, please leave a message." The verifying signal it typically a one second, 2000 Hz tone placed on the paging terminal line 8 by the RCC terminal 7. The switch 2 has no way of recognizing such a signal. The interface 5, however, is capable of recognizing the signal tone passed through the line 8 and signaling the host computer 3 through line 6 that the page has (or has not) been placed. Once the host computer 3 determines that the page has (or has not) been placed by the RCC 7, the paging terminal line 8 is released and is available to service the next call-in.

Turning now to FIG. 2, a flow chart is shown for the general call protocol of the message systems S, using the equipment of FIG. 1. When a call is received at 12 on the trunks 1, the switch 2 under control of the host processor 3, determines or checks if it is a valid call at 13, so as to avoid wrong numbers, etc. If the call is not valid, an error message is played at 14 and the caller is disconnected at 15, by the switch 2.

If the call is valid, however, a determination is made as to whether the call is from a caller or subscriber at 16 by the host processor 3, based on the unique call number. If a subscriber is on-line at 17, a check is made at 18 to determine if a caller is waiting. If a caller is waiting, as determined by the host computer 3, a "meet" is established at 19 when the switch 2 is instructed by the host computer 3 to connect the caller and subscriber trunk lines 1 until the connection is finished, such as signaled by the caller or subscriber "hanging-up", at which time the "meet" is disconnected at 15. If no caller is waiting, the subscriber has any waiting messages delivered at 20 by audio signal from the VPS 9 through the audio lines 10 and 11 and the interface 5, as previously discussed, and under the direction of the host computer 3. The messages may be automatically delivered or may require commands or identifications, interpreted by the host computer 3, to permit message delivery. After all messages have been delivered the call is disconnected at 15.

Returning to the identity of the person on-line at 16, if a caller is on line at 21, a check is made at 22 to see if the subscriber is on the system S at that time. If the subscriber is on the system and available, a check being made at 23 to see if the subscriber is busy with another call, then again, a "meet" is established at 19. If the subscriber is not on the system at 22 or not available at 23, however, a page is placed by the RCC, as described previously, at 24. Alternatively, if the subscriber is not available at 23, the caller may be asked to wait for the subscriber to become available or leave a message, as mentioned previously, and as now more fully described.

After a page has been placed at 24, a message is played to the caller at 25 from the VPS 9 requesting the caller to wait for the subscriber to call in. The message may also include a message that a page has been successfully placed. After the initiation of the message at 25, the host processor 3 determines if the subscriber is on the system S at 26 until the preselected hold time has expired at 27. If the subscriber does enter the system S before the hold time is up, as at 27, a "meet" is established; if not, a "leave message" request is played from the VPS 9 at 28 and a caller message is recorded on the VPS 9 at 29 before the system disconnects the caller at 15.

Further modifications will also occur to those skilled in the art, and such are considered to fall within the spirit and scope of the invention as defined in the appended claims.

What is claimed is:

1. A method of providing communication between a remote subscriber of a paging system and a caller to the system, that comprises receiving a call from the caller via telephone trunk line means; obtaining an identification number of a remote subscriber from the caller and verifying the identification number in a host computer; employing the host computer to cause a radio carrier terminal to page the subscriber; and, if the subscriber answers the page by calling the host computer via the telephone trunk line means and providing the subscriber's identification number within a preselected time, thereupon automatically switching the subscriber and the caller into direct telephone connection via the telephone trunk line means under the direction of the host computer, but if the subscriber fails to so answer the page within said preselected time, thereupon, under the control of the host computer, providing a recorded voice message to the caller via the telephone trunk line means indicating that the subscriber has not answered the page, inviting the caller to leave a voice message for the subscriber, and recording the caller's voice message for later retrieval by the subscriber in response to the subscriber's calling the host computer.

2. A method of providing communication between a remote subscriber and a caller in a telephone communication system having a telephone trunk interface connected with a host computer, with a switching system having telephone trunk line means connected thereto, with a radio carrier terminal, and with a voice processing system, said method comprising accepting through the switching system a caller's call to a subscriber on the telephone trunk line means and verifying the identification of the subscriber in the host computer; thereupon paging the subscriber by way of the interface and the radio carrier terminal under the control of the host computer; and, if the subscriber answers the page within a preselected time via the telephone trunk line means, automatically connecting the subscriber to the caller through the switching system under the control of said host computer, but if the subscriber fails to so answer the page, within said preselected time, operating said voice processing system, under the control of the host computer, and through the interface and the switching system and the telephone trunk line means, causing the voice processing system to inform the caller that the subscriber has failed to answer the page, to invite the caller to provide a voice message, to record the voice message from the caller, and ultimately to deliver the recorded voice message to the subscriber.

3. A method in accordance with claim 2, further comprising causing, in response to the paging of the subscriber, the voice processing system to inform the caller of the paging of the subscriber.

4. Apparatus for providing communication between a remote subscriber and a caller in a telephone communication system, said apparatus comprising a telephone trunk interface connected with a host computer, with a telephone line switching system having telephone trunk line means connected thereto, with a radio carrier terminal, and with a voice processing system, said host computer having, in combination, means operable through said switching system for receiving a caller's call to a subscriber via the telephone trunk line means and verifying the identification of the subscriber in the host computer; means operable through said interface and a connection therefrom to the radio carrier terminal for thereupon causing said radio carrier terminal to page the subscriber; means operable upon the subscriber's answering the page via the telephone trunk line means within a preselected time for causing the switching system automatically to connect the subscriber to the caller via the telephone trunk line means to provide direct telephone communication between the subscriber and the caller; and means operable upon the failure of the subscriber to so answer the page within said preselected time for causing said voice processing system, through said interface and said switching system, to invite the caller to provide a voice message and to store the voice message; means for thereafter causing the switching system to disconnect the caller; and means operable when the subscriber ultimately responds to the page via the telephone trunk line means for causing the voice processing system, through the interface and the switching system, to deliver the stored message to the subscriber via the telephone trunk line means.

5. Apparatus in accordance with claim 4, wherein said radio carrier terminal has means for providing a verifying signal that the page has been made, and further comprising means responsive to said verifying signal for signalling the host computer that the page has been made, and further wherein the host computer includes means responsive to said signalling for thereupon releasing said connection to the radio carrier terminal so that the connection is available for use in making another page.

6. Apparatus in accordance with claim 5, wherein said verifying signal is a tone signal and wherein the interface includes means for recognizing said tone signal and for causing said signalling means to signal the host computer that the page has been made.

7. Apparatus in accordance with claim 5, the host computer further having means operable in the absence of said verifying signal for causing said voice processing system, through said interface and said switching system, to inform the caller that the subscriber cannot be paged.

* * * * *